(12) United States Patent
Deng et al.

(10) Patent No.: US 8,775,188 B2
(45) Date of Patent: Jul. 8, 2014

(54) METHOD, DEVICE, AND SYSTEM FOR VOICE APPROVAL

(71) Applicant: Huawei Technologies Co., Ltd., Guangdong (CN)

(72) Inventors: Weijun Deng, Nanjing (CN); Yu Yin, Nanjing (CN); Liyan Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/951,165

(22) Filed: Jul. 25, 2013

(65) Prior Publication Data

US 2013/0311191 A1 Nov. 21, 2013

Related U.S. Application Data

(63) Continuation of application No. PCT/CN2012/087552, filed on Dec. 26, 2012.

(30) Foreign Application Priority Data

Jan. 5, 2012 (CN) .......................... 2012 1 0002038

(51) Int. Cl.
| | | |
|---|---|---|
| *G10L 25/00* | (2013.01) | |
| *H04L 12/66* | (2006.01) | |
| *H04M 1/64* | (2006.01) | |
| *H04M 11/00* | (2006.01) | |
| *G06F 15/16* | (2006.01) | |
| *G06F 7/04* | (2006.01) | |
| *G06F 21/00* | (2013.01) | |
| *G06Q 20/00* | (2012.01) | |
| *G06Q 40/00* | (2012.01) | |

(52) U.S. Cl.
USPC ........ 704/273; 704/270; 704/270.1; 704/275; 370/351; 370/352; 370/310; 379/88.01; 379/88.02; 379/88.04; 379/88.16; 455/406; 455/407; 455/408; 455/410; 455/411; 455/412.1; 455/412.2; 455/413; 455/415; 709/201; 709/203; 709/227; 709/230; 709/238; 709/200; 726/2; 726/3; 726/4; 726/5; 726/6; 726/17; 726/27; 726/28; 726/29; 726/30; 705/50; 705/53; 705/65; 705/72; 705/75; 705/76; 705/78; 705/79; 705/1.1; 705/40; 705/41; 705/42; 705/43; 705/44

(58) Field of Classification Search
CPC ........... G07C 9/00126; G07C 9/00166; G10L 13/00; G10L 2013/00; H04M 2201/40; H04M 1/271; H04M 3/493; H04M 3/42204; H04M 3/382; G06Q 10/10; G06Q 10/107; H04L 29/0872; H04L 63/08; H04W 12/08; H04W 12/06; G06F 21/31
USPC ....................................... 704/270, 270.1, 275
See application file for complete search history.

(56) References Cited

U.S. PATENT DOCUMENTS

| | | | | |
|---|---|---|---|---|
| 6,859,524 | B2 * | 2/2005 | Unger et al. ............... | 379/88.16 |
| 7,035,386 | B1 * | 4/2006 | Susen et al. ............... | 379/93.02 |
| 7,130,800 | B1 * | 10/2006 | Currey et al. ................ | 704/273 |
| 7,448,075 | B2 * | 11/2008 | Morand et al. .................... | 726/7 |
| 7,716,055 | B1 | 5/2010 | McIntosh et al. | |
| 8,014,756 | B1 * | 9/2011 | Henderson .................... | 455/411 |
| 8,103,246 | B2 * | 1/2012 | Singhal ......................... | 455/411 |
| 8,483,666 | B2 * | 7/2013 | Bozionek et al. ............. | 455/413 |
| 8,566,911 | B2 * | 10/2013 | Tu et al. .......................... | 726/4 |
| 8,571,526 | B2 * | 10/2013 | Kass et al. ................. | 455/414.1 |
| 2002/0031209 | A1 | 3/2002 | Smithies et al. | |
| 2002/0082995 | A1 * | 6/2002 | Christie, IV .................... | 705/44 |
| 2002/0123938 | A1 * | 9/2002 | Yu et al. ........................... | 705/26 |
| 2003/0095542 | A1 * | 5/2003 | Chang et al. .................. | 370/352 |
| 2003/0101134 | A1 * | 5/2003 | Liu et al. ........................ | 705/39 |
| 2005/0086164 | A1 * | 4/2005 | Kim et al. ....................... | 705/40 |
| 2007/0244811 | A1 * | 10/2007 | Tumminaro ................... | 705/39 |
| 2008/0033994 | A1 | 2/2008 | Sharma | |
| 2008/0146211 | A1 * | 6/2008 | Mikan et al. .................. | 455/419 |
| 2008/0177661 | A1 * | 7/2008 | Mehra ............................. | 705/44 |
| 2008/0235768 | A1 * | 9/2008 | Walter et al. ..................... | 726/3 |
| 2009/0158402 | A1 | 6/2009 | Ding | |
| 2010/0161403 | A1 * | 6/2010 | Fisher et al. ............... | 705/14.38 |
| 2010/0202596 | A1 * | 8/2010 | Andrews et al. ........... | 379/88.01 |

| 2011/0021172 | A1* | 1/2011 | Ricordi et al. ............. 455/404.1 |
| 2012/0150750 | A1* | 6/2012 | Law et al. ...................... 705/76 |
| 2013/0166915 | A1* | 6/2013 | Desai et al. .................. 713/176 |

FOREIGN PATENT DOCUMENTS

| CN | 1848174 A | 10/2006 |
| CN | 1852090 A | 10/2006 |
| CN | 101127625 A | 2/2008 |
| CN | 101470875 A | 7/2009 |
| WO | WO 2007107972 A2 | 9/2007 |

OTHER PUBLICATIONS

International Search Report in corresponding PCT Patent Application No. PCT/CN2012/087552 (Apr. 4, 2013).

\* cited by examiner

*Primary Examiner* — Paras D Shah
(74) *Attorney, Agent, or Firm* — Leydig, Voit & Mayer, Ltd.

(57) ABSTRACT

Embodiments of the present invention provide a method for voice approval, where the method includes: receiving voice approval request information sent by an enterprise application server; establishing a voice communication connection with the terminal according to the contact information of the approver terminal; sending approval content audio information corresponding to the voice approval request information to the approver terminal; receiving feedback information, and obtaining approval result information according to the feedback information; and sending the approval result information to the enterprise application server. Embodiments of the present invention also provide a device and system for voice approval. In the embodiments of the present invention, the enterprise application server and the enterprise gateway are combined and improved to enable an approver to approve, in voice mode, an approval request raised by an applicant, thereby increasing the approval efficiency.

8 Claims, 10 Drawing Sheets

METHOD, DEVICE, AND SYSTEM FOR VOICE APPROVAL

CROSS-REFERENCE TO RELATED APPLICATIONS

This application is a continuation of International Patent Application No. PCT/CN2012/087552, filed on Dec. 26, 2012, which claims priority to Chinese Patent Application No. 201210002038.3, filed on Jan. 5, 2012, both of which are hereby incorporated by reference in their entireties.

TECHNICAL FIELD

The present invention relates to the field of communication technologies, and in particular, to a method, device, and system for voice approval.

BACKGROUND

To increase the approval efficiency, the enterprise workflows are approved at an IT-based platform rather than a traditional paper platform. Specifically, there are the following applications:

In the conventional art, the approval can be performed in an enterprise workflow system by using a network platform; an applicant selects an approval request through an enterprise information portal EIP (Enterprise Information Portal, that is, an application system that integrates various application systems, data resources, and Internet resources under the Internet environment, forms a customized application interface according to different use characteristics and roles of each user, and organically links users together by processing and transmitting events and messages); the network platform sends the approval request to a corresponding approver; the approver performs the approval through the enterprise information portal; and the network platform feeds back an approval result to the applicant for confirmation.

In the actual use process, the inventor finds that the conventional art has at least the following problems:

When the approver cannot log in to the enterprise information portal, the approver cannot approve the approval request of the applicant, so that the approval efficiency is greatly reduced.

SUMMARY

Therefore, it is necessary to provide a method, device, and system for voice approval to solve the problem of low approval efficiency in the method of the conventional art.

In one aspect, the present invention provides an embodiment of a method for voice approval, including:

receiving, by an enterprise gateway, voice approval request information sent by an enterprise application server, where the voice approval request information includes contact information of an approver terminal;

establishing, by the enterprise gateway, a voice communication connection with the approver terminal according to the contact information of the approver terminal;

sending, by the enterprise gateway, approval content audio information corresponding to the voice approval request information to the approver terminal by using the voice communication connection;

receiving, by the enterprise gateway, feedback information which is sent by the approver terminal according to the approval content audio information, and obtaining approval result information according to the feedback information; and sending, by the enterprise gateway, the approval result information to the enterprise application server.

In addition, the present invention also provides an embodiment of an enterprise gateway device, where the device includes:

a voice approval request information receiving unit, configured to receive voice approval request information sent by an enterprise application server, where the voice approval request information includes contact information of an approver terminal;

a connection establishing unit, connected to the voice approval request information receiving unit and configured to establish a voice communication connection with the approver terminal according to the contact information of the approver terminal;

an approval content audio information sending unit, connected to the connection establishing unit and configured to send approval content audio information corresponding to the voice approval request information to the approver terminal by using the voice communication connection;

an approval result information obtaining unit, configured to receive feedback information which is sent by the approver terminal according to the approval content audio information and obtain approval result information according to the feedback information; and an approval result information sending unit, connected to the approval result information obtaining unit and configured to send the approval result information to the enterprise application server.

Finally, the present invention further provides an embodiment of a system for processing enterprise workflow approval, including:

an enterprise application server, configured to: receive voice approval request information; send the voice approval request information to an enterprise gateway, where the voice approval request information includes identity information of a pending work item and contact information of an approver terminal; and obtain approval result information sent by the enterprise gateway; and the enterprise gateway, connected to the enterprise application server and configured to: receive the voice approval request information sent by the enterprise application server; establish a voice communication connection with the approver terminal according to the contact information of the approver terminal; send approval content audio information corresponding to the voice approval request information to the approver terminal by using the voice communication connection, receive feedback information which is sent by the approver terminal according to the approval content audio information, obtain approval result information according to the feedback information, and send the approval result information to the enterprise application server.

In the embodiments of the present invention, an enterprise gateway receives voice approval request information sent by an enterprise application server, establishes a voice communication connection with an approver terminal by using contact information of the approver terminal in the voice approval request information, and sends approval content audio information to the approver terminal by using the voice communication connection, so that the approver terminal learns pending content; the enterprise gateway receives feedback information, obtained by the approver terminal, of an approver with respect to the approval content audio information, obtains approval result information according to the feedback information, and feeds back the approval result information to the enterprise application server. By using the foregoing method, the enterprise application server can send an approval request to the approver terminal in audio mode, which makes it possible to perform approval in voice mode, thereby increasing the approval efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Telephony is the most common communication mode at present, and is subject to fewer restrictions as compared with a network platform. If an approver can approve an application of an applicant by using a phone, the scope of work of the approver may be greatly extended, and may be no longer restricted by the approval mode of the network platform.

Figure 1:
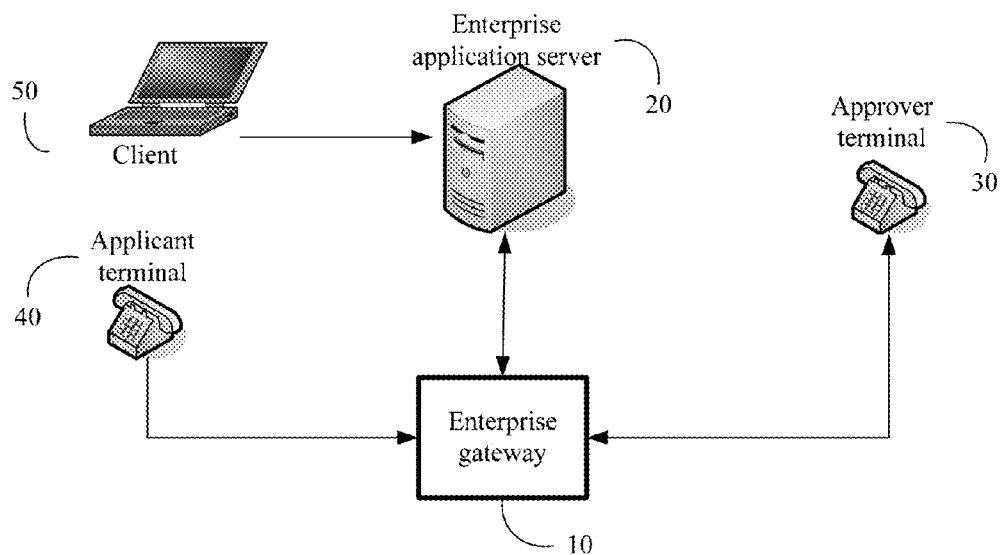
FIG. 1 is a networking architecture diagram according to an embodiment of the present invention.

Before the method is described, the networking architecture of a system for processing enterprise workflow approval is firstly described. As shown in FIG. 1, the system for processing enterprise workflow approval includes an enterprise gateway 10, an enterprise application server 20, an approver terminal 30, an applicant terminal 40, and a client 50. The enterprise gateway 10 is connected to the enterprise application server 20, the approver terminal 30, and the applicant terminal 40, and the enterprise application server 20 is connected to the client 50.

Figure 2:
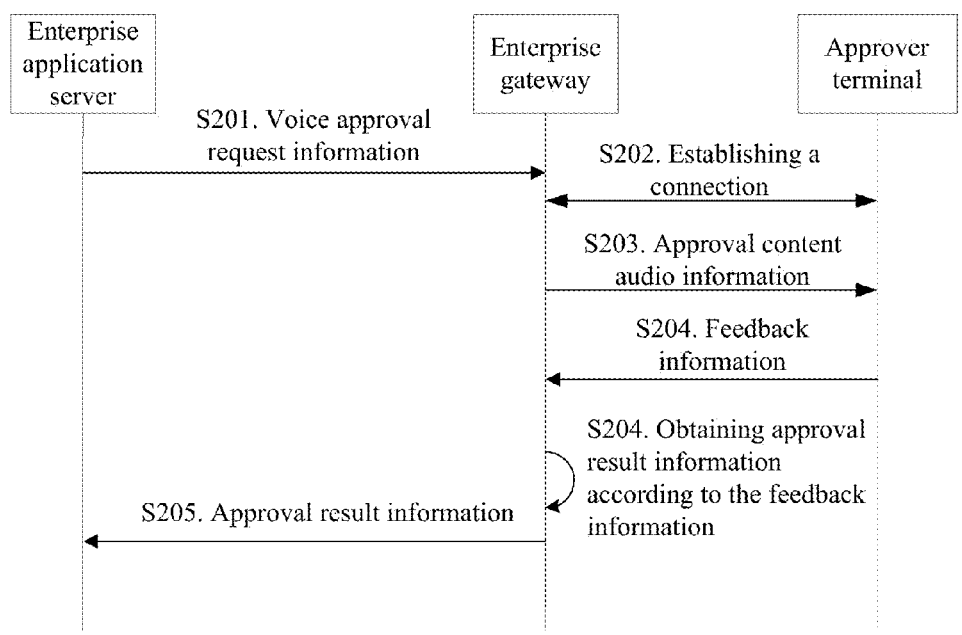
FIG. 2 is a flowchart of a method according to a first method embodiment of the present invention.

A first method embodiment of the present invention provides an embodiment of a method for voice approval. As shown in FIG. 2, the process includes the following:

S201. An enterprise gateway receives voice approval request information sent by an enterprise application server, where the voice approval request information includes contact information of an approver terminal.

S202. The enterprise gateway establishes a voice communication connection with the approver terminal according to the contact information of the approver terminal.

S203. The enterprise gateway sends approval content audio information corresponding to the voice approval request information to the approver terminal by using the voice communication connection.

S204. The enterprise gateway receives feedback information which is sent by the approver terminal according to the approval content audio information, and obtains approval result information according to the feedback information.

S205. The enterprise gateway sends the approval result information to the enterprise application server.

In the foregoing embodiment, an enterprise gateway receives voice approval request information sent by an enterprise application server, establishes a voice communication connection with an approver terminal by using contact information of the approver terminal in the voice approval request information, and sends approval content audio information to the approver terminal by using the voice communication connection, so that the approver terminal learns pending content; the enterprise gateway receives feedback information, obtained by the approver terminal, of an approver with respect to the approval content audio information, obtains approval result information according to the feedback information, and feeds back the approval result information to the enterprise application server. By using the foregoing method, the enterprise application server can send an approval request to the approver terminal in audio mode, which makes it possible to perform approval in voice mode, thereby increasing approval efficiency.

Figure 3:
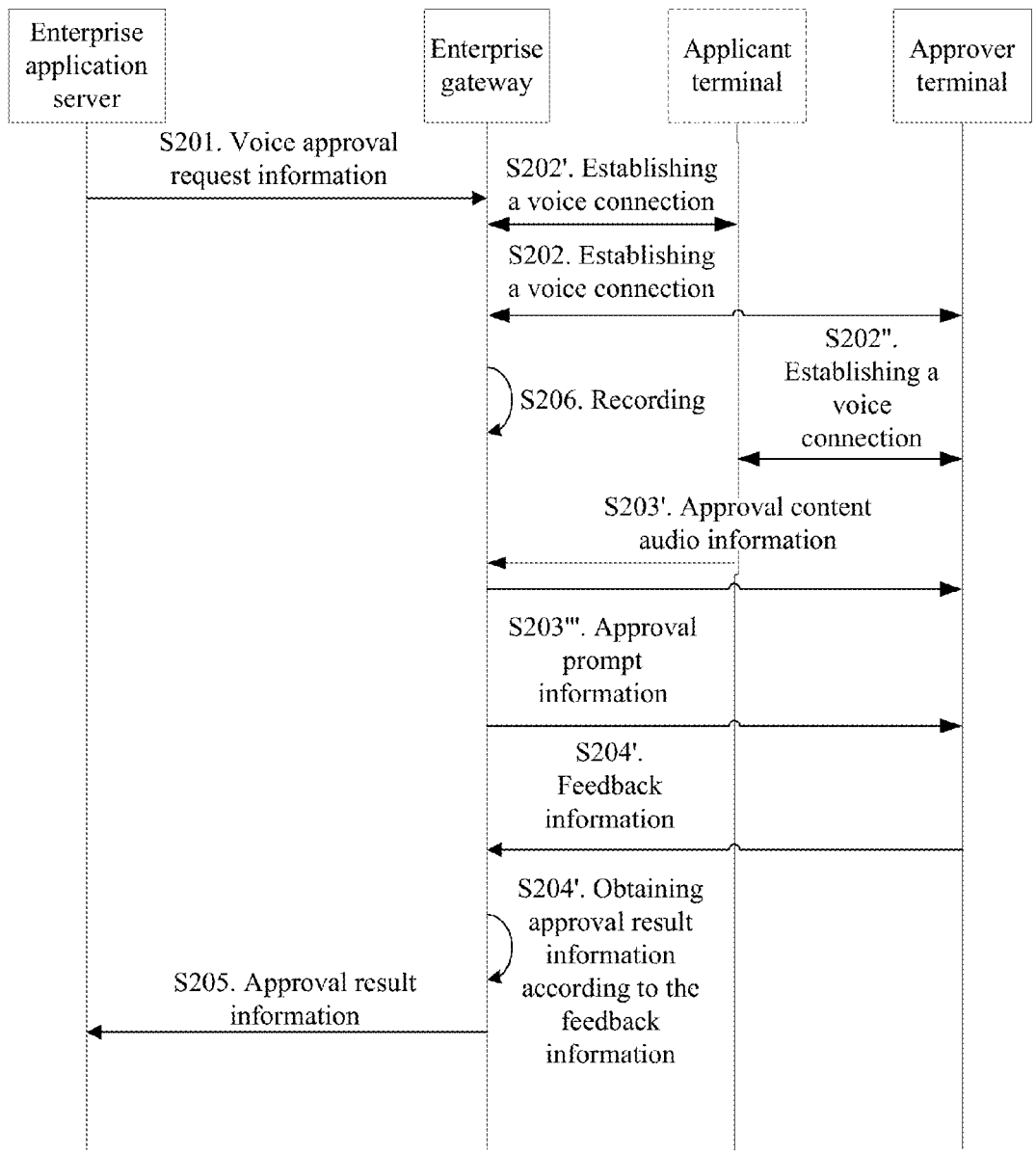
FIG. 3 is a flowchart of a method according to a first specific implementation manner of the first method embodiment of the present invention.

In the specific implementation process, two implementation manners are available:

Manner 1: As shown in FIG. 3, the voice approval request information further includes contact information of an applicant terminal.

After the enterprise gateway receives the voice approval request information sent by the enterprise application server in S201, the method further includes the following:

S202'. The enterprise gateway establishes a voice communication connection with the applicant terminal according to the contact information of the applicant terminal.

S202". The enterprise gateway establishes a voice communication connection between the applicant terminal and the approver terminal.

Sending, by the enterprise gateway, approval content audio information corresponding to the voice approval request information to the approver terminal by using the voice communication connection in S203 specifically includes the following:

S203'. The enterprise gateway sends approval content audio information sent by the applicant terminal to the approver terminal by using the voice communication connection between the applicant terminal and the approver terminal.

By using the foregoing implementation manner, the enterprise gateway can establish a voice communication connection with the applicant terminal according to the contact information of the applicant terminal, and establish a voice communication connection between the applicant terminal and the approver terminal according to the voice communication connection established with the approver terminal. In this way, the applicant can inform an approver of approval content in dictation mode by using the communication connection between the applicant terminal and the approver terminal, so that the approver learns specific pending content.

Figure 4:
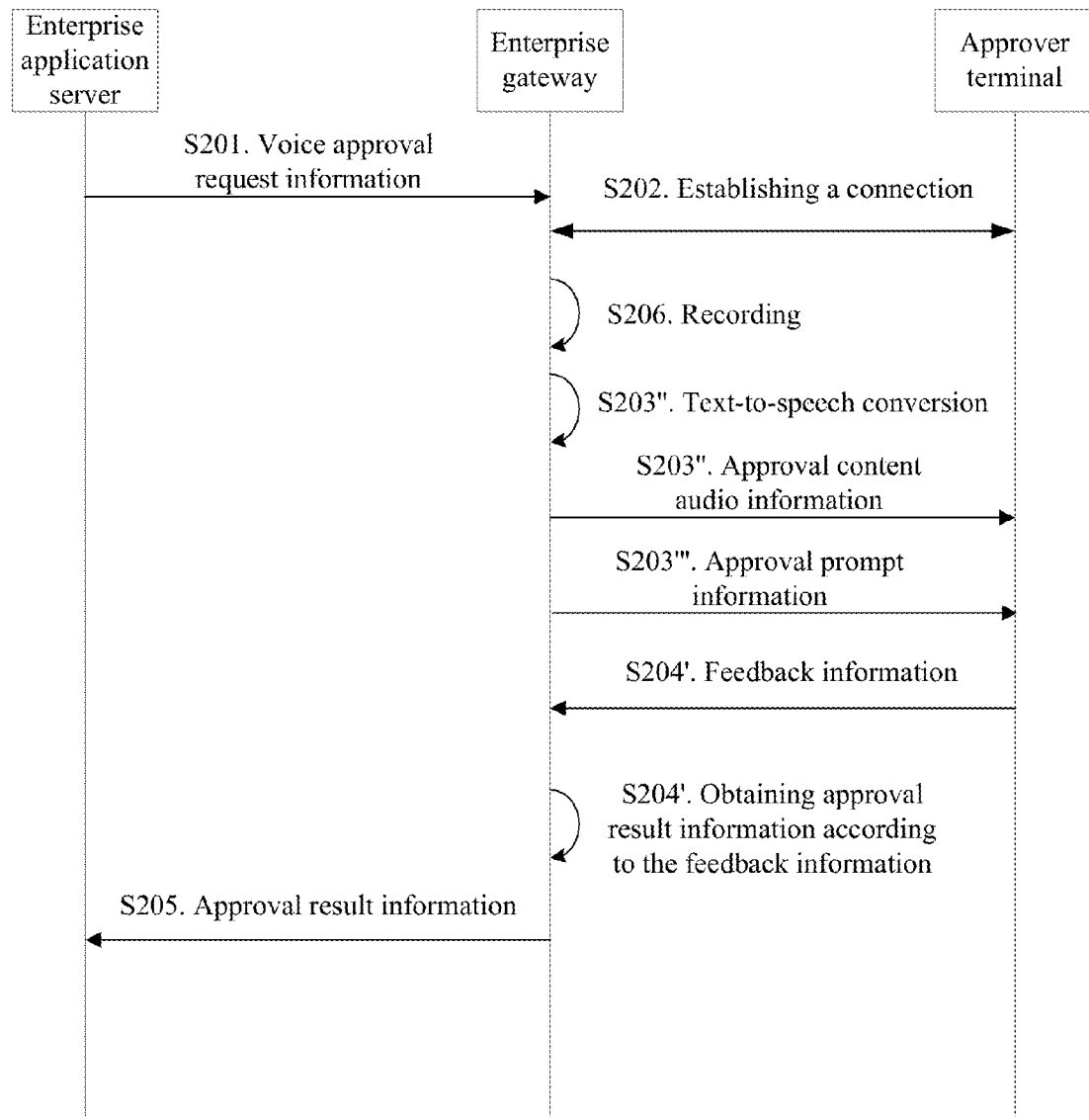
FIG. 4 is a flowchart of a method according to a second specific implementation manner of the first method embodiment of the present invention.

Manner 2: As shown in FIG. 4, the voice approval request information further includes approval content text information.

Sending, by the enterprise gateway, approval content audio information to the approver terminal by using the voice communication connection in S203 specifically includes the following:

S203'''. The enterprise gateway converts the approval content text information into approval content audio information by using a text-to-speech technology, and sends the approval content audio information to the approver terminal by using the voice communication connection.

By using the foregoing implementation manner, the enterprise gateway can convert approval content text information in the voice approval request information sent by the enterprise application server into audio information, and send the audio information to the approver terminal by using the voice communication connection between the enterprise gateway and the approver terminal, so that the approver learns specific pending content by using the approver terminal. By using the foregoing method, processes of establishing a voice communication connection between the enterprise gateway and the applicant terminal and a voice communication connection between the applicant terminal and the approver terminal are not required, implementation processes are simplified, and the complexity of implementing the method is reduced.

It is understandable that there are other manners for sending the approval content audio information to the approver terminal, and the foregoing manners are only examples. Other implementation manners thought of by persons of ordinary skill in the art according to the inspiration of the embodiment of the present invention also fall within the protection scope of the present invention.

Further, the voice approval request information further includes identity information of a pending work item.

After the enterprise gateway sends the approval content audio information to the approver terminal by using the voice communication connection in S203, the method further includes the following:

S203'''. The enterprise gateway sends approval prompt information to the approver terminal according to the identity information of the pending work item by using the voice communication connection between the enterprise gateway and the approver terminal, where the approval prompt information includes pre-stored mapping relationship between approval results and keys of the approver terminal;

Receiving, by the enterprise gateway, feedback information which is sent by the approver terminal according to the approval content audio information and obtaining approval result information according to the feedback information in S204 specifically include the following:

S204'. The enterprise gateway receives selected key information which is sent by the approver terminal according to the approval content audio information and the approval prompt information, and obtains approval result information according to the mapping between approval results and keys of the approver terminal.

By using the foregoing method, the enterprise gateway can determine, according to selected key information sent by the approver terminal, an approval result by using the relationship between selected key information and approval result, and conversion from a key of a user to the approval result is implemented.

Further, after the enterprise gateway establishes a voice communication connection with the approver terminal according to the voice approval request information in S202, the method further includes the following:

S206. The enterprise gateway records voice information exchanged with the approver terminal, and stores the recorded voice information.

With S206, the enterprise gateway can perform audio recording on approval content audio information and/or approval voice prompt information in an approval process, thereby making it more convenient to backtrack and query an approval result.

Figure 5:
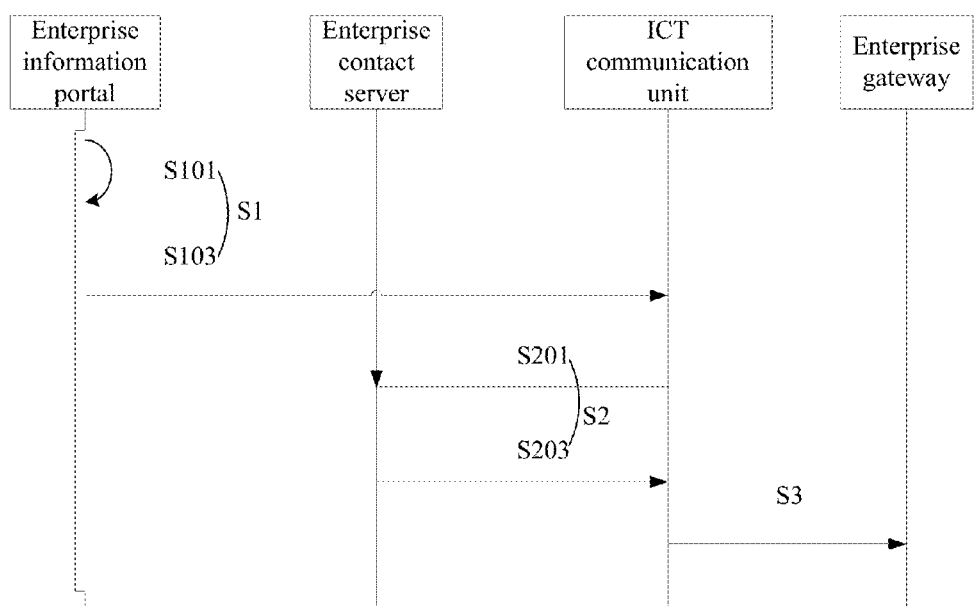
FIG. 5 is a first part of a flowchart of a method according to a second method embodiment of the present invention.

Specifically, a second method embodiment of the present invention describes a workflow of voice approval based on the assumption that an applicant applies for a specific work item in an approval process and an approver approves, by using an approver terminal and under the guidance of an enterprise gateway, approval content of the specific work item applied for by the applicant. The method includes the following steps:

S1 to S3 are shown in FIG. 5.

S1. An enterprise application server receives voice approval request start information sent by an applicant.

The enterprise application server may receive voice approval request start information, sent by the applicant, by using multiple manners, that is, the applicant sends approval request information to the enterprise application server by using a client, where the client includes, but is not limited to, a PC, a laptop (notebook PC), a Tablet PC (tablet PC), and a mobile phone.

The enterprise application server includes an enterprise information portal, an ICT (Information Communication Technology, information communication technology) communication unit, and an enterprise contact database.

S101. The applicant selects a pending work item through the enterprise information portal to initiate voice approval request start information.

For example, the applicant enters identity information of the applicant, and queries, through the enterprise information portal, a task that can be applied for by the applicant; after the query, the enterprise information portal displays a list of pending work items that can be requested by the applicant; the information of a pending work item mainly includes identity information of the pending work item, identity information of the applicant, and identity information of the approver terminal or the contact information of the approver terminal.

The manner of obtaining the contact information of the approver terminal may be as follows:

The contact information of the approver terminal is pre-stored in the information of the pending work item: After the applicant queries, according to the identity information of the applicant, a pending work item that can be applied for, the information of the pending work item directly includes the contact information of the approver terminal of a corresponding approver.

In addition, the manner of obtaining the contact information of the approver terminal may also be as follows:

The contact information of the approver terminal is queried according to the identity information of the approver. Specific steps are as follows:

The applicant can make a selection according to multiple pending work items provided by a list of application tasks. Specifically, if the applicant selects a pending work item of applying for attending a meeting and needs to get approval from the approver, the applicant can choose the "approve by phone" option through the enterprise information portal, and send voice approval request start information, as shown in Table 1 below.

TABLE 1

| Task | Application | Applicant | Date | Approval Request |
|---|---|---|---|---|
| Waiting for Attendance Checker Approval | Attendance | xiaweiyi | 2011.10.10 | Approve by phone |

S103. The enterprise information portal sends the voice approval request start information to the ICT communication unit, where the voice approval request start information includes identity information of a pending work item. In addition, the enterprise information portal sends the identity information of the applicant and the identity of the approver which are corresponding to a voice approval request.

It should be noted that the identity information of a pending work item is used to identify a specific pending work item, and is used to identify the IVR (Interactive Voice Response, interactive voice response) approval voice prompt corresponding to the pending work item.

S2. The enterprise application server obtains contact information of the approver terminal and contact information of the applicant terminal from an enterprise contact database according to the identity information of the approver and the identity information of the applicant.

S201. The ICT communication unit queries the contact information of the applicant terminal and the contact information of the approver terminal from the enterprise contact database according to the identity information of the applicant and the identity information of the approver.

The contact information of the applicant terminal and the contact information of the approver terminal may be a telephone number, a mobile phone number, or other contact numbers capable of implementing voice communication, which is not limited by the embodiment of the present invention.

S203. The enterprise contact database returns the contact information of the applicant terminal and the contact information of the approver terminal to the ICT communication unit.

It should be noted that the foregoing two manners are only preferred manners of the embodiment of the present invention and that other manners without departing from the spirit of the present invention and without the need of creative improvement certainly fall within the protection scope of the present invention.

S3. The ICT communication unit of the enterprise application server sends voice approval request information to the enterprise gateway, wherein the information includes the contact information of the applicant terminal, the contact information of the approver terminal, and the identity information of the pending work item.

Figure 6:
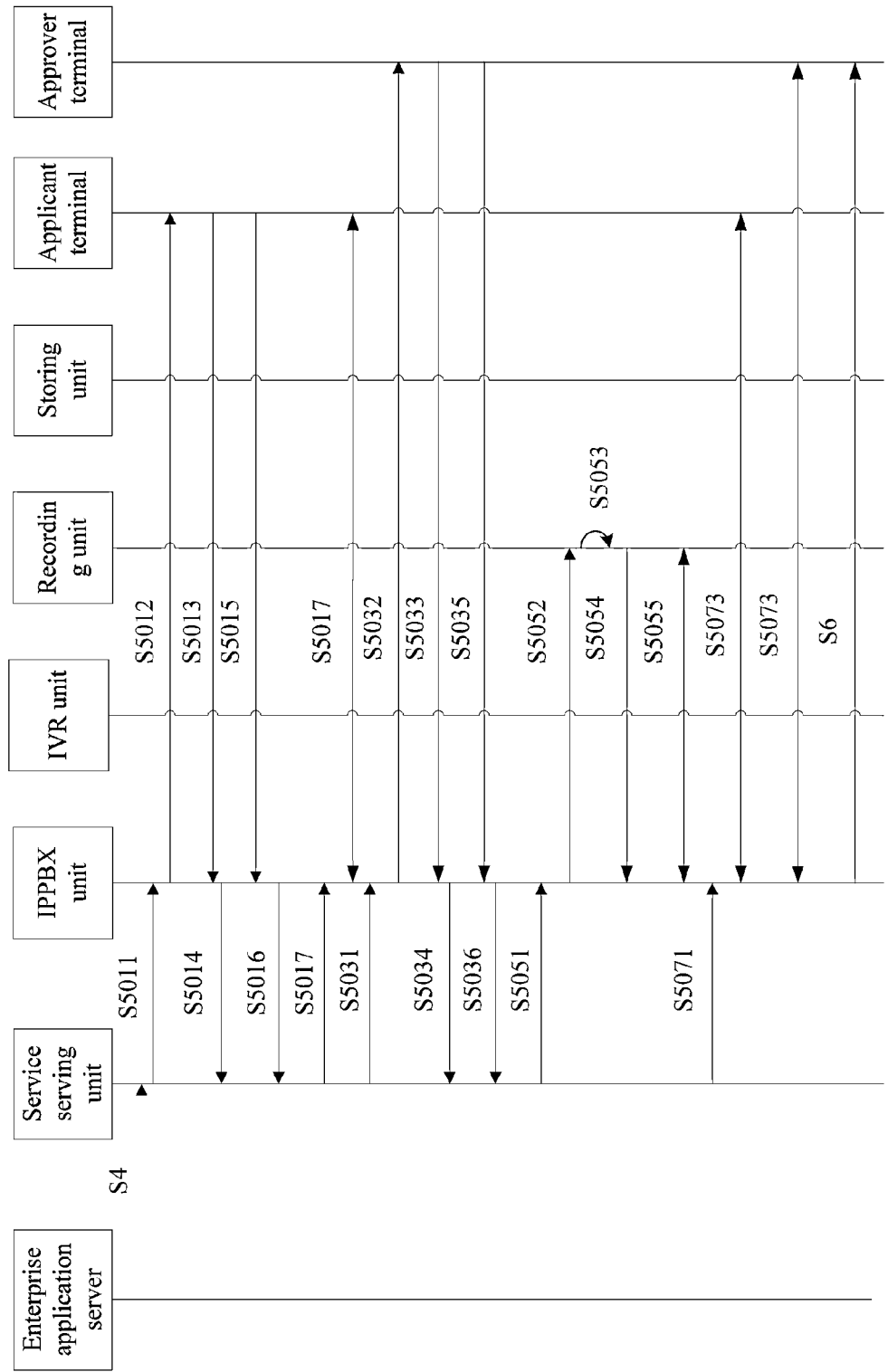
FIG. 6 is a second part of a flowchart of a method according to the second method embodiment of the present invention.

S4 to S6 are shown in FIG. 6.

S4. The enterprise gateway receives voice approval request information sent by the enterprise application server, where the information includes contact information of the approver terminal, contact information of the applicant terminal, and identity information of a pending work item.

The enterprise gateway includes a service serving unit, an IP PBX (Internet Protocol Private Branch eXchange, Internet protocol private branch exchange) unit, an IVR unit, a recording unit, and a storing unit.

The ICT communication unit invokes a customized interface provided by a service serving unit of the enterprise gateway. In this example, a SOAP (Simple Object Access Protocol, simple object access protocol) protocol interface is used to send voice approval request information, where the voice approval request information includes contact information of the approver terminal, contact information of the applicant terminal, and identity information of a pending work item.

S5. The enterprise gateway establishes a voice communication connection between the applicant terminal and the approver terminal according to the contact information of the applicant terminal and the contact information of the approver terminal, and starts the recording unit to perform recording.

S501. The enterprise gateway establishes a voice communication connection with the applicant terminal according to the contact information of the applicant terminal.

S5011. The service serving unit instructs the IP PBX unit to initiate a call to the applicant terminal.

S5012. The IP PBX unit sends INVITE signaling to call the applicant terminal.

S5013. The applicant terminal is ringing, and sends a 180 ringing message to notify the IP PBX unit.

S5014. The IP PBX unit notifies the service serving unit that the applicant terminal is ringing.

S5015. The applicant terminal answers the call, and sends a 200OK message to notify the IP PBX unit.

S5016. The IP PBX unit notifies the service serving unit that the applicant terminal already answers the call.

S5017. The service serving unit controls the IP PBX unit to play an announcement to the applicant terminal; the service serving unit instructs the IP PBX unit to play an announcement "the approver is being connected" to the applicant terminal.

S503. The enterprise gateway establishes a voice communication connection with the approver terminal according to the contact information of the approver terminal.

It should be noted that step S501 and step S503 may be performed in any sequence, which is not limited by the embodiment of the present invention.

S5031. The service serving unit instructs the IP PBX unit to initiate a call to the approver terminal.

S5032. The IP PBX unit sends INVITE signaling to call the approver terminal.

S5033. The applicant terminal is ringing, and sends a 180 ringing message to notify the IP PBX unit.

S5034. The IP PBX unit notifies the service serving unit that the approver terminal is ringing.

S5035. The approver terminal answers the call, and sends a 200OK message to notify the IP PBX unit.

S5036. The IP PBX unit notifies the service serving unit that the applicant terminal already answers the call.

S505. The enterprise gateway starts recording.

S5051. The service serving unit instructs the IP PBX unit to start call recording.

S5052. The IP PBX unit sends INVITE signaling to the recording unit to request a recording resource.

S5053. The recording unit starts recording.

S5054. The recording unit returns, to the IP PBX unit, a 200OK message indicating that the recording resource is requested successfully.

S5055. The IP PBX unit establishes a voice communication connection with the recording unit, and the recording unit starts recording.

S507. The enterprise gateway establishes a voice communication connection between the applicant terminal and the approver terminal.

S5071. The service serving unit instructs the IP PBX unit to stop playing an announcement to the applicant terminal and connect to the applicant terminal.

S5073. The IP PBX unit establishes a voice communication connection between the applicant terminal and the approver terminal.

S6. The enterprise gateway sends approval content audio information, obtained by the applicant terminal, to the approver terminal through the voice communication connection between the applicant terminal and the approver terminal.

With the foregoing implementation manner, the enterprise gateway can establish a voice communication connection with the applicant terminal according to the contact information of the applicant terminal, and establish a voice communication connection between the applicant terminal and the approver terminal according to the voice communication connection established with the approver terminal. In this way, the applicant can inform an approver of approval content in dictation mode by using the communication connection between the applicant terminal and the approver terminal, so that the approver learns specific pending content.

Figure 7:
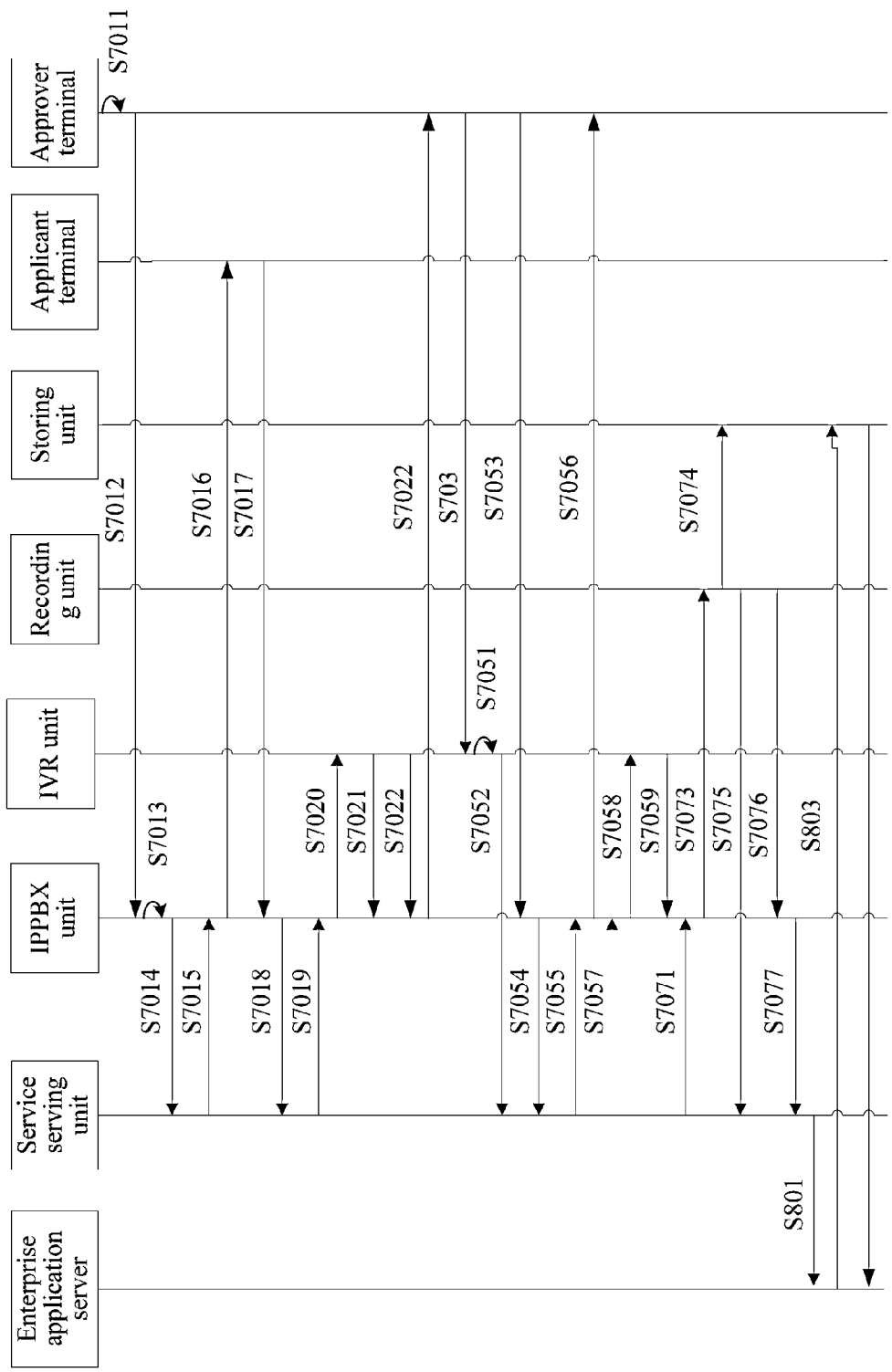
FIG. 7 is a third part of a flowchart of a method according to the second method embodiment of the present invention.

S7 to S8 are shown in FIG. 7.

S7. The enterprise gateway receives feedback information which is sent by the approver terminal according to approval content audio information, and obtains approval result information according to the feedback information.

S701. The enterprise gateway sends approval prompt information to the approver terminal according to the identity information of the pending work item by using the voice communication connection between the enterprise gateway and the approver terminal, where the approval prompt information includes pre-stored mapping between approval results and keys of the approver terminal.

S7011. After the enterprise gateway sends the approval content audio information to the approver terminal by using the voice communication connection between the applicant terminal and the approver terminal, the applicant enters 9# through the keys of the applicant terminal to request entering the IVR unit for approval.

It should be noted that the content entered with the keys may be customized and is not limited to this specific implementation manner of this embodiment.

S7012. The applicant terminal sends the content 9# entered with the keys to the IP PBX unit through the voice communication connection in DTMF (Dual Tone Multi Frequency, dual tone multi frequency) mode.

S7013. The IP PBX unit identifies the key and determines that the meaning of the key is disconnecting the voice communication connection with the applicant terminal and establishing a voice communication connection with the IVR unit.

S7014. The IP PBX unit instructs the service serving unit to disconnect the voice communication connection with the applicant terminal and establish a voice communication connection with the IVR unit.

S7015. The service serving unit instructs the IP PBX unit to terminate the call initiated to the applicant terminal.

S7016. The IP PBX unit sends Bye signaling to the applicant terminal to terminate the call.

S7017. The applicant terminal returns a 200OK message to the IP PBX unit.

S7018. The IP PBX unit notifies the service serving unit that the call initiated to the applicant terminal is already terminated.

S7019. The service serving unit instructs the IP PBX unit to connect to the IVR unit, where the instruction carries identity information of a pending work item.

S7020. The IP PBX unit carries the identity information of the pending work item, and sends INVITE signaling to the IVR unit to request connecting to the IVR unit.

S7021. The IVR unit returns a 200OK message to the IP PBX unit, indicating that the connection succeeds.

S7022. The IP PBX unit establishes a voice communication connection between the IVR unit and the approver terminal.

After the voice communication connection is established, the IVR unit plays a specific IVR announcement according to the identity information of a pending work item; for example, if the sent identity information of a pending work item is 1, the IVR unit plays the following announcement pre-defined for the pending work item whose identity information is 1: "please press a key to select an approval result; press 1 to consent, press 2 to reject, press 9 to cancel, or press 0 to re-listen."

S703. The approver terminal obtains a key selected by the approver according to the approval prompt information, and sends the selected key information as feedback information to the enterprise gateway.

After the approver selects, according to the approval prompt information, a key by using the approver terminal, the approver terminal sends the selected key information to the IVR unit by using the voice communication connection with the IVR unit, where the DTMF signal of the key is used as feedback information sent to the IVR unit.

S705. The enterprise gateway receives the selected key information which is sent by the approver terminal according to the approval prompt information, and obtains the approval result information according to the mapping between approval results and keys of the approver terminal.

S7051. The IVR unit converts the received selected key information DTMF signal into a key number, and then according to the key number, queries a specific approval result selected by the approver to obtain approval result information.

For example, in this embodiment, if the approver selects the key 1 through the approver terminal to indicate consent, the approver terminal sends the selected key information, that is, the DTMF signal of the key 1 to the IVR unit by using the voice communication connection; the IVR unit converts the DTMF signal into the key 1, and then according to the key 1, determines an approval result indicating consent of the approver and obtains the approval result information.

S7052. The IVR unit notifies the approval result to the service serving unit, where the notification carries the identity information of the pending work item and the approval result information.

S7053. The approver terminal hangs up, and sends BYE signaling to the IP PBX unit.

S7054. The IP PBX unit notifies the service serving unit that the approver terminal hangs up.

S7055. The service serving unit notifies the IP PBX unit that the approver terminal hangs up.

S7056. The IP PBX unit sends a 200OK message to the approver terminal to confirm that the approver terminal hangs up, and disconnects the voice communication connection with the approver terminal.

S7057. The service serving unit instructs the IP PBX unit to terminate the communication with the IVR unit.

S7058. The IP PBX unit sends BYE signaling to the IVR unit to indicate hang-up.

S7059. The IVR unit feeds back a 200OK message to the IP PBX unit.

S707. The enterprise gateway terminates the recording.

S7071. The service serving unit instructs the IP PBX unit to terminate the recording, where the instruction carries the identity information of a pending work item.

S7073. The IP PBX unit instructs the recording unit to terminate the recording, wherein the instruction carries the identity information of a pending work item.

S7074. The recording unit terminates the recording, and stores an audio file in the storing unit.

S7075. The recording unit notifies the identity information of a pending work item and a storage address of the audio file to the service serving unit.

S7076. The recording unit feeds back a 200OK message to the IP PBX unit to indicate that the recording is completed.

S7077. The IP PBX unit notifies the service serving unit that the recording is completed.

By using the foregoing method, the enterprise gateway can determine, according to selected key information sent by the approver terminal, an approval result by using the relationship between the selected key information and approval result, and conversion from a key of a user to the approval result is implemented.

S8. The enterprise gateway sends the approval result information to the enterprise application server.

S801. The service serving unit of the enterprise gateway sends the approval result information to the ICT communication unit of the enterprise application server, where the approval result information includes the identity information of a pending work item, the approval result information, and the storage address of the audio file.

S803. The ICT communication unit invokes an approval process of an approval process customized structure interface (a SOAP protocol interface is used in this embodiment) of a workflow engine according to the identity information of a pending work item and the approval result information returned by the enterprise communication gateway, obtains a call audio file from the storing unit, and stores the call audio file locally as an approval record for future reference.

In addition, a third method embodiment of the present invention further provides an embodiment of a method for voice approval. Specifically, in the foregoing embodiment, specific content of a voice approval request is dictated by an applicant to an approver by using a voice communication connection between an applicant terminal and an approver terminal; however, with the method provided in this embodiment, when it is inconvenient for the applicant to make a dictation, the applicant can still send the specific content of the voice approval request to the approver by using the voice communication connection between the applicant terminal and the approver terminal in voice mode. The steps of the method are as follows:

S1 to S3 are shown in FIG. 5.

S1. An enterprise application server receives voice approval request start information from an applicant.

The enterprise application server includes an enterprise information portal, an ICT communication unit, and an enterprise contact database.

S101. The applicant selects a specific work item in an approval process on an enterprise information portal Web page to initiate approval request information.

The specific step is the same as that in the foregoing second method embodiment.

S103. The enterprise information portal initiates the voice approval request start information to the ICT communication unit, and sends an identity of an approver corresponding to a voice approval request or contact information of an approver terminal, approval content text information, and identity information of a pending work item. It should be noted that the identity information of a pending work item is used to identify a specific pending work item, and is used to identify an IVR (Interactive Voice Response, interactive voice response) approval voice prompt corresponding to the pending work item.

A first manner of obtaining the contact information of the approver terminal is the same as that described in the second method embodiment of the present invention, and a second manner is as follows:

S2. The enterprise application server obtains the contact information of the approver terminal from an enterprise contact database according to the identity information of the approver.

S201. The ICT communication unit queries the contact information of the approver terminal from the enterprise contact database according to the identity information of the approver.

S203. The enterprise contact database returns the contact information of the approver terminal to the ICT communication unit.

S3. The enterprise application server sends voice approval request information to the enterprise gateway, where the information includes the contact information of the approver terminal, the approval content text information, and the identity information of a pending work item.

Figure 8:
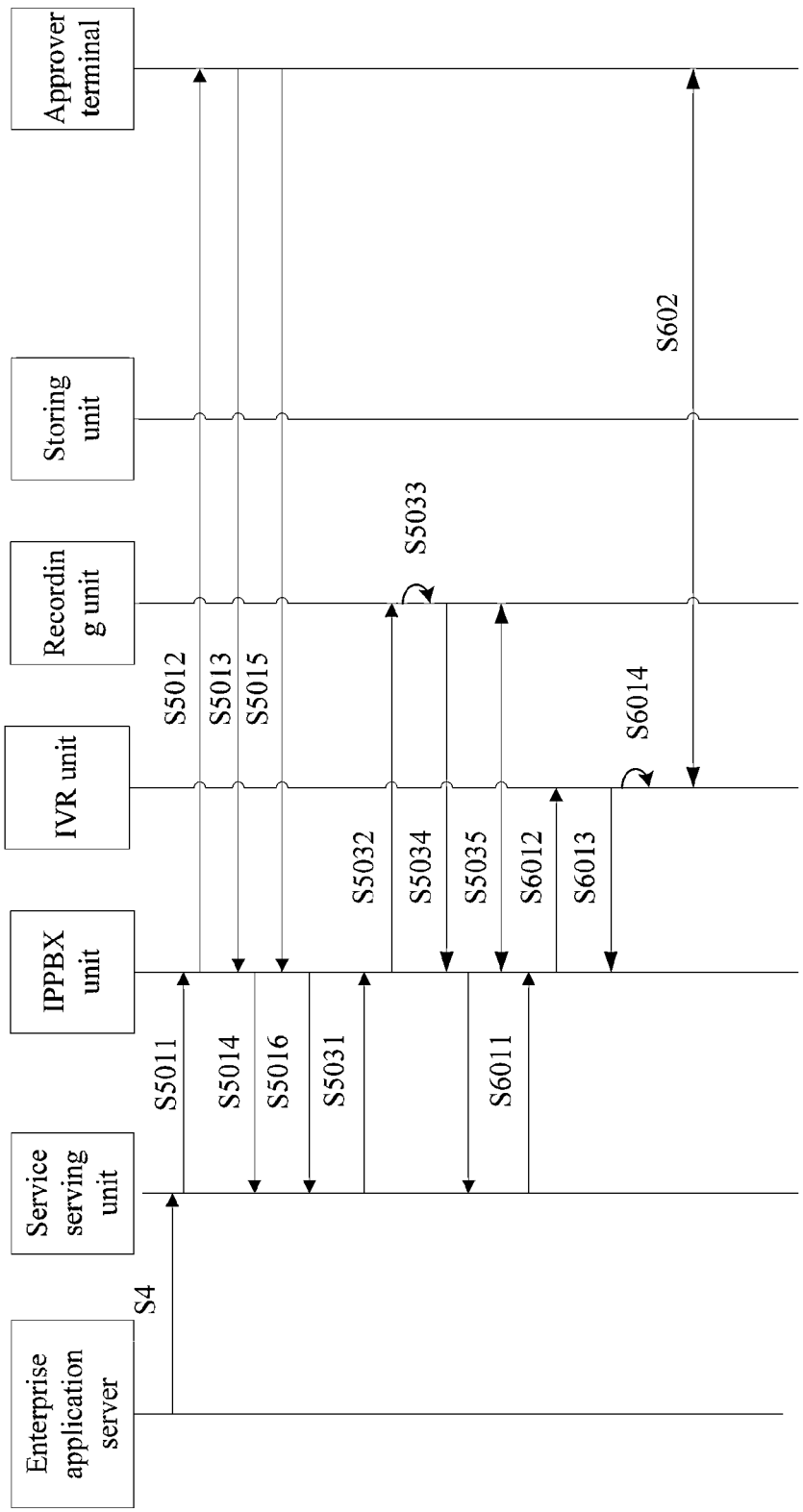
FIG. 8 is a flowchart of a method according to a third method embodiment of the present invention.

S4 to S6 are shown in FIG. 8.

S4. The enterprise gateway receives voice approval request information sent by the enterprise application server, where the information includes contact information of the approver terminal, approval content text information, and identity information of a pending work item.

The enterprise gateway includes a service serving unit, an IP PBX unit, an IVR unit, a recording unit, and a storing unit.

The ICT communication unit invokes a customized interface (in this embodiment, a SOAP protocol interface is used) provided by the service serving unit of the enterprise gateway, to send voice approval request information, where the voice approval request information includes contact information of the approver terminal, approval content text information, and identity information of a pending work item.

S5. The enterprise gateway establishes a voice communication connection with the approver terminal according to the contact information of the approver terminal.

S501. The enterprise gateway establishes a voice communication connection with the approver terminal according to the contact information of the approver terminal.

S5011. The service serving unit instructs the IP PBX unit to initiate a call to the approver terminal.

S5012. The IP PBX unit sends INVITE signaling to call the approver terminal.

S5013. The approver terminal is ringing, and sends a 180 ringing message to notify the IP PBX unit.

S5014. The IP PBX unit notifies the service serving unit that the approver terminal is ringing.

S5015. The approver terminal answers the call, and sends a 200OK message to notify the IP PBX unit.

S5016. The IP PBX unit notifies the service serving unit that the applicant terminal already answers the call.

S503. The enterprise gateway starts recording.

S5031. The service serving unit instructs the IP PBX unit to start call recording.

S5032. The IP PBX unit sends INVITE signaling to the recording unit to request a recording resource.

S5033. The recording unit starts recording.

S5034. The recording unit returns, to the IP PBX unit, a 200OK message indicating that the recording resource is requested successfully.

S5035. The IP PBX unit establishes a voice communication connection with the recording unit, and the recording unit starts recording.

S6. The enterprise gateway sends approval content audio information to the approver terminal by using the voice communication connection.

S601. The enterprise gateway converts the approval content text information into approval content audio information by using a text-to-speech technology.

S6011. The service serving unit instructs the IP PBX unit to connect to the IVR unit, wherein the instruction carries voice approval request information, where the voice approval request information includes corresponding approval content text information and identity information of a pending work item.

S6012. The IP PBX unit sends an INVITE to the IVR unit, requesting connecting to the IVR unit.

S6013. The IVR unit returns a 200OK, indicating that the connection succeeds.

S6014. The IVR unit starts the text-to-speech technology, and converts the approval content text information into approval content audio information.

S602. The enterprise gateway sends the approval content audio information to the approver terminal.

The IVR unit establishes a voice communication connection with the approver terminal, and sends the approval content audio information to the approver terminal by using the voice communication connection.

Processes of S7 and S8 are the same as those in the foregoing embodiment and are not further described.

By using the foregoing implementation manner, the enterprise gateway can convert the approval content text information in the voice approval request information sent by the enterprise application server into audio information, and send the audio information to the approver terminal by using the voice communication connection between the enterprise gateway and the approver terminal, so that the approver learns specific pending content by using the approver terminal. By using the foregoing method, processes of establishing a voice communication connection between the enterprise gateway and the applicant terminal and a voice communication connection between the applicant terminal and the approver terminal are not required, implementation processes are simplified, and the complexity of implementing the method is reduced.

Figure 9:
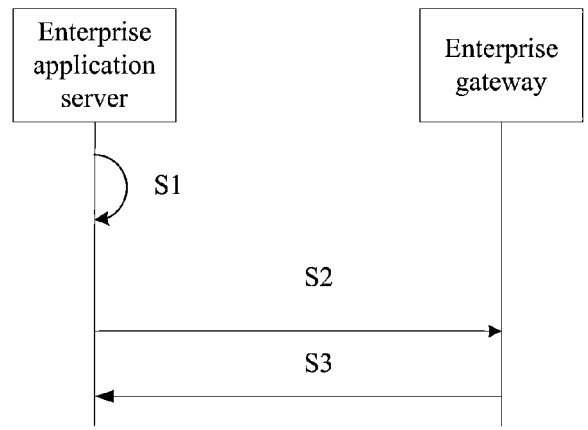
FIG. 9 is a flowchart of a method according to a fourth method embodiment of the present invention.

A fourth method embodiment of the present invention also provides an embodiment of a method for voice approval by using an enterprise application server, and as shown in FIG. 9, the method includes the following:

S1. An enterprise application server receives voice approval request start information, where the voice approval request start information includes identity information of a pending work item.

S2. The enterprise application server sends voice approval request information corresponding to the voice approval request start information to an enterprise gateway, where the voice approval request information includes contact information of an approver terminal used to establish a voice communication connection with the approver terminal, so that the enterprise gateway sends approval content audio information corresponding to the voice approval request information to the approver terminal by using the voice communication connection.

S3. The enterprise application server obtains approval result information sent by the enterprise gateway.

Further, when or after receiving the voice approval request start information, the enterprise application server further receives identity information of an approver.

S1'. The enterprise application server obtains the contact information of the approver terminal from an enterprise contact database according to the identity information of the approver.

Alternatively, when or after receiving the voice approval request start information, the enterprise application server further receives the contact information of the approver terminal.

Further, the enterprise application server receives identity information of an applicant terminal in addition to the identity information of the approver or the contact information of the approver terminal.

S1". The enterprise application server obtains contact information of the applicant terminal from the enterprise contact database according to the identity information of the applicant.

The voice approval request information further includes the contact information of the applicant terminal.

Specifically, this embodiment describes a workflow of a method for voice approval through an enterprise communication gateway based on the assumption that the applicant applies for a specific work item in an approval process and the approver terminal approves, by using the enterprise communication gateway, the approval content of the specific work item applied for by the applicant. The steps of the method are the same as those in the foregoing embodiment, and are not further described herein.

In the foregoing embodiment, an enterprise application server sends voice approval request information to an enterprise gateway, so that the enterprise gateway establishes a voice communication connection with an approver terminal by using contact information of the approver terminal in the voice approval request information, and sends approval content audio information to the approver terminal by using the voice communication connection, so that the approver learns pending content and performs approval by using the approver terminal; and the enterprise application server receives approval result information fed back by the enterprise gateway. By using the foregoing method, the enterprise application server can send an approval request to the approver terminal in audio mode, which makes it possible to perform approval in voice mode, thereby increasing the approval efficiency.

Figure 10:
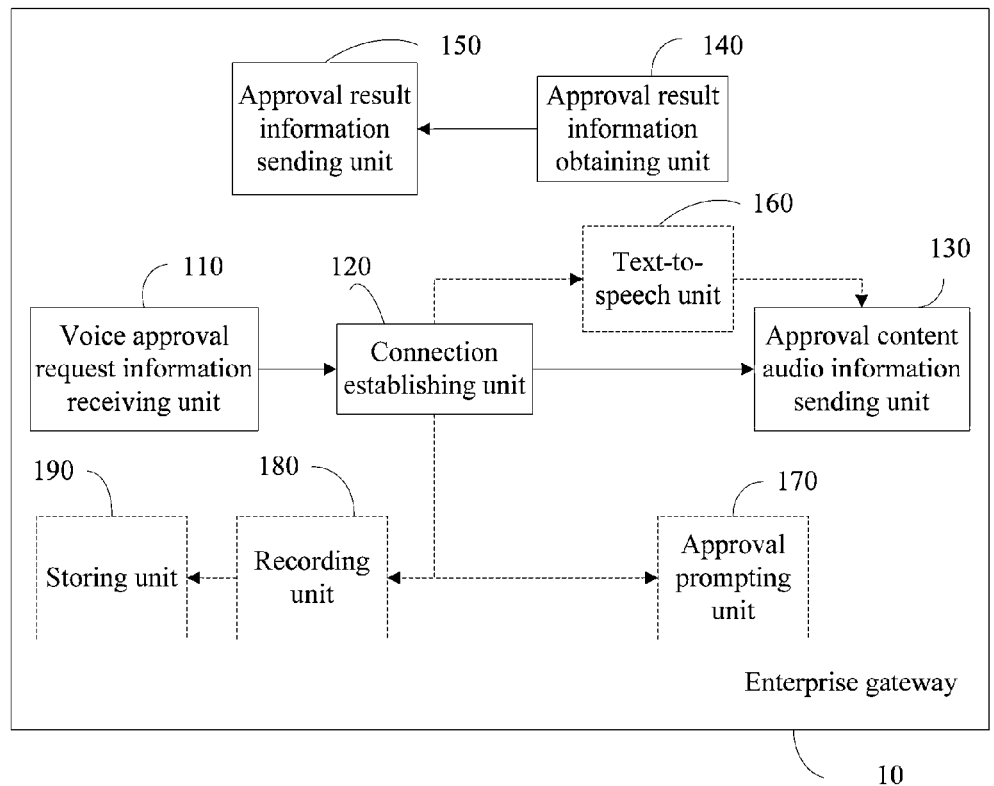
FIG. 10 is a structural diagram of a first apparatus embodiment of the present invention.

A first apparatus embodiment of the present invention provides an embodiment of an enterprise gateway device 10. As shown in FIG. 10, mandatory units are represented by using solid lines, while optional units are represented by using dotted lines, The enterprise gateway device 10 includes:

a voice approval request information receiving unit 110, configured to receive voice approval request information sent by an enterprise application server, where the voice approval request information includes contact information of an approver terminal;

a connection establishing unit 120, connected to the voice approval request information receiving unit 110 and configured to establish a voice communication connection with the approver terminal according to the contact information of the approver terminal;

an approval content audio information sending unit 130, connected to the connection establishing unit 120 and configured to send approval content audio information corresponding to the voice approval request information to the approver terminal by using the voice communication connection;

an approval result information obtaining unit 140, configured to receive feedback information which is sent by the approver terminal according to the approval content audio information and obtain approval result information according to the feedback information; and an approval result information sending unit 150, connected to the approval result information obtaining unit 140 and configured to send the approval result information to the enterprise application server.

Optionally, the voice approval request information further includes contact information of an applicant terminal. In the enterprise gateway device:

The connection establishing unit 120 is specifically configured to establish a voice communication connection with the applicant terminal according to the contact information of the applicant terminal, and establish a voice communication connection between the applicant terminal and the approver terminal.

The approval content audio information sending unit 130 is specifically configured to send the approval content audio information, sent by the applicant terminal, to the approver terminal by using the voice communication connection between the applicant terminal and the approver terminal.

By using the foregoing implementation manner, the enterprise gateway can establish a voice communication connection with the applicant terminal according to the contact information of the applicant terminal, and establish a voice communication connection between the applicant terminal and the approver terminal according to the voice communication connection established with the approver terminal. In this way, an applicant can inform an approver of approval content in dictation mode by using the communication connection between the applicant terminal and the approver terminal, so that the approver learns specific pending content.

Optionally, the voice approval request information further includes approval content text information; the enterprise gateway device 10 further includes:

a text-to-speech unit 160, connected to the connection establishing unit 120 and the approval content audio information sending unit 130 and configured to convert the approval content text information into approval content audio information by using a text-to-speech technology, and send the approval content audio information to the approval content audio information sending unit 130.

By using the foregoing implementation manner, the enterprise gateway can convert the approval content text information in the voice approval request information sent by the enterprise application server into audio information, and send the audio information to the approver terminal by using the voice communication connection between the enterprise gateway and the approver terminal, so that the approver learns specific pending content by using the approver terminal. By using the foregoing method, processes of establishing a voice communication connection between the enterprise gateway and the applicant terminal and a voice communication connection between the applicant terminal and the approver terminal are not required, implementation processes are simplified, and the complexity of implementing the method is reduced.

Optionally, the voice approval request information further includes identity information of a pending work item; the enterprise gateway device 10 further includes:

an approval prompting unit 170, connected to the connection establishing unit 120 and configured to send approval prompt information to the approver terminal according to the identity information of the pending work item by using the voice communication connection between the enterprise gateway and the approver terminal, where the approval prompt information includes pre-stored mapping between approval results and keys of the approver terminal; where the approval result information obtaining unit 140 is specifically configured to receive key information which is sent by the approver terminal according to the approval prompt information, and convert, according to the mapping between approval results and keys of the approver terminal, the key information, received by the receiving unit, into approval result information.

By using the foregoing method, the enterprise gateway can determine, according to the key information sent by the approver terminal, an approval result by using the relationship between the key information and approval result, and conversion from a key of a user to the approval result is implemented.

Optionally, the enterprise gateway device 10 further includes:

a recording unit 180, connected to the connection establishing unit 120 and configured to record voice information exchanged with the approver terminal; and a storing unit 190, configured to store the voice information recorded by the recording unit.

With S205, the enterprise gateway can perform audio recording on the approval content audio information and/or the approval voice prompt information in an approval process, thereby making it more convenient to backtrack and query approval results.

A second apparatus embodiment of the present invention provides an embodiment of an enterprise gateway device with reference to the second method embodiment of the present invention and FIG. 10.

Figure 11:
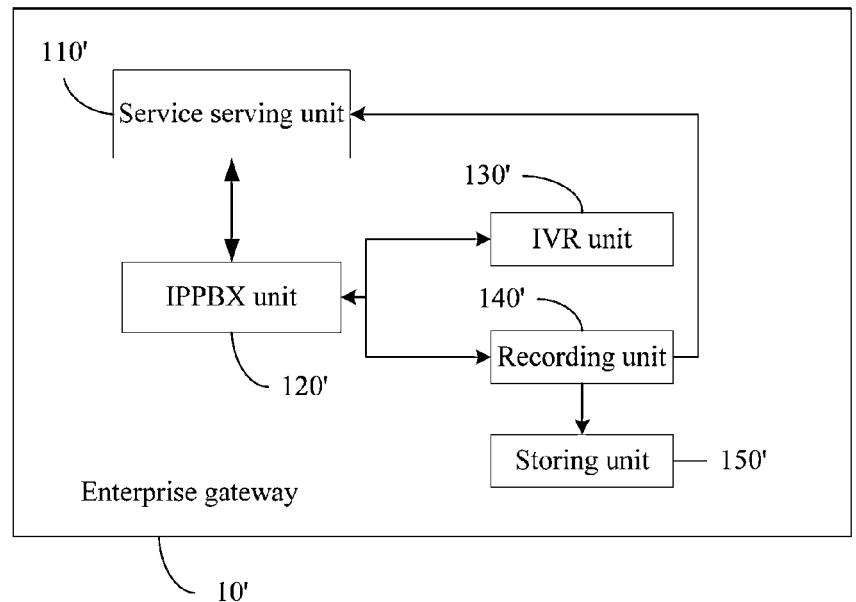
FIG. 11 is a structural diagram of a second apparatus embodiment of the present invention.

In the specific implementation process, an enterprise gateway device 10' may be formed by a service serving unit 110', an IP PBX unit 120', an IVR unit 130', a recording unit 140', and a storing unit 150', as shown in FIG. 11.

Functions of the voice approval request information receiving unit 110 may be specifically performed by the service serving unit 110'.

Functions of the connection establishing unit 120 may be specifically performed together by the service serving unit 110' and the IP PBX unit 120'.

The service serving unit 110' controls the IP PBX unit 120' to establish a voice communication connection between the IP PBX unit 120' and an applicant terminal, controls the IP PBX unit 120' to establish a voice communication connection between the IP PBX unit 120' and an approver terminal, and controls the IP PBX unit 120' to establish a voice communication connection between the applicant terminal and the approver terminal.

Functions of the approval content audio information sending unit 130 may be specifically performed together by the applicant terminal and the IP PBX unit 120'.

The IP PBX unit 120' sends the approval content audio information, obtained by the applicant terminal, to the approver terminal by using the voice communication connection between the applicant terminal and the approver terminal.

Functions of the approval result information obtaining unit 140 may be specifically performed by the IVR unit 130'.

The IVR unit 130' receives feedback information sent by the approver terminal, and obtains approval result information according to the feedback information.

Functions of the approval result information sending unit 150 may be specifically performed by the service serving unit 110'.

The service serving unit 110' sends the approval result information to the enterprise application server.

Functions of the approval prompting unit 170 may be performed by the IVR unit 130'.

The IVR unit 130' sends approval prompt information to the approver terminal by using the voice communication connection between the IVR unit 130' and the approver terminal.

By using the foregoing implementation manner, the enterprise gateway can establish a voice communication connection with the applicant terminal according to the contact information of the applicant terminal, and establish a voice communication connection between the applicant terminal and the approver terminal according to the voice communication connection established with the approver terminal. In this way, an applicant can inform an approver of approval content in dictation mode by using the communication connection between the applicant terminal and the approver terminal, so that the approver learns specific pending content.

In addition, a third apparatus embodiment of the present invention provides an embodiment of an enterprise gateway device with reference to the third method embodiment of the present invention and FIG. 10. The enterprise gateway device may be formed by the service serving unit 110', the IP PBX unit 120', the IVR unit 130', the recording unit 140', and the storing unit 150', as shown in FIG. 11.

Functions of the approval content audio information sending unit 130 may be specifically performed by the IVR unit 130'.

The IVR unit 130' sends approval content audio information to the approver terminal by using the voice communication connection between the IVR unit 130' and the approver terminal.

The text-to-speech unit 160 is configured to convert the approval content text information into approval content audio information by using a text-to-speech technology, and send the approval content audio information to the approval content audio information sending unit.

Functions of the text-to-speech unit 160 may be specifically performed by the IVR unit 130'.

The IVR unit 130' converts the approval context text information into approval content audio information by using the text-to-speech technology.

The voice approval request information receiving unit 110, the connection establishing unit 120, the approval result information obtaining unit 140, the approval result information sending unit 150, the approval prompting unit 170, the recording unit 180, the storing unit 190, and the like are the same as those in the foregoing embodiment, and are not further described herein.

By using the foregoing implementation manner, the enterprise gateway can convert the approval content text information in the voice approval request information sent by the enterprise application server into audio information, and send the audio information to the approver terminal by using the voice communication connection between the enterprise gateway and the approver terminal, so that an approver learns specific pending content by using the approver terminal. By using the foregoing method, processes of establishing a voice communication connection between the enterprise gateway and the applicant terminal and a voice communication connection between the applicant terminal and the approver terminal are not required, implementation processes are simplified, and the complexity of implementing the method is reduced.

Figure 12:
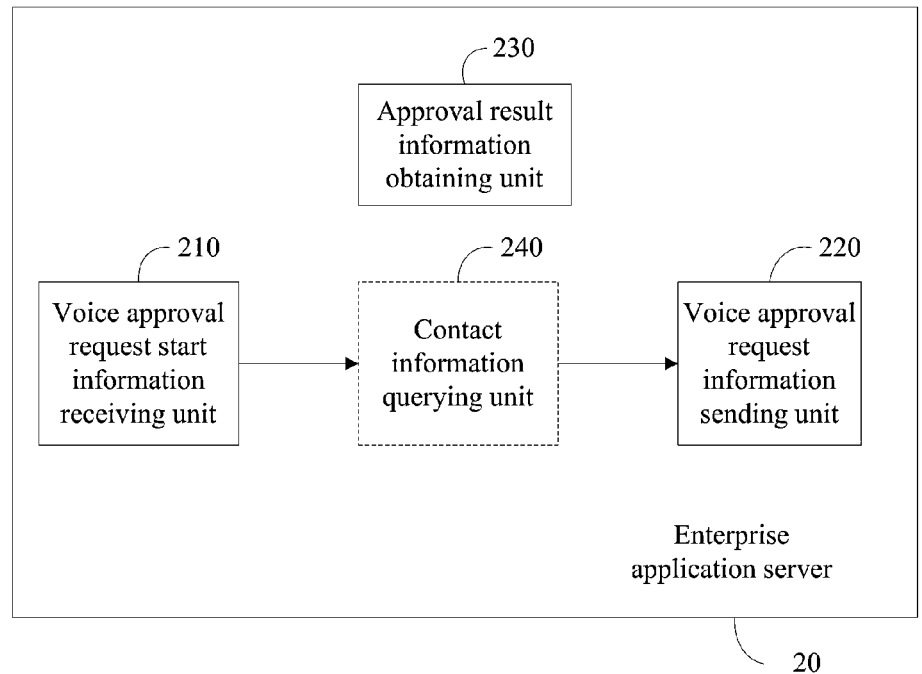
FIG. 12 is a structural diagram of a fourth apparatus embodiment of the present invention.

A fourth apparatus embodiment of the present invention provides an enterprise application server 20, as shown in FIG. 12, including:

a voice approval request start information receiving unit 210, configured to receive voice approval request start information, where the voice approval request start information includes identity information of a pending work item;

a voice approval request information sending unit 220, connected to the voice approval request start information receiving unit and configured to send voice approval request information to an enterprise gateway, where the voice approval request information includes contact information of an approver terminal, where the contact information of the approver terminal is used to establish a voice communication connection between the enterprise gateway and the approver terminal, and the voice communication connection is used for the enterprise gateway to send approval content audio information corresponding to the voice approval request information to the approver terminal; and an approval result information obtaining unit 230, configured to obtain approval result information sent by the enterprise gateway, where the approval result information is obtained by the enterprise gateway according to feedback information sent by the approver terminal, where the feedback information is obtained by the approver terminal according to the approval content audio information.

Optionally, the voice approval request start information receiving unit 210 is further configured to receive identity information of an approver, and the enterprise application server further includes:

a contact information querying unit 240, configured to obtain the contact information of the approver terminal from an enterprise contact database according to the identity information of the approver.

Optionally, the voice approval request start information receiving unit 210 is further configured to receive the contact information of the approver terminal.

Further, the voice approval request start information receiving unit 210 is further configured to receive identity information of an applicant terminal, and in the enterprise application server:

the contact information querying unit 240 is connected to the voice approval request start information receiving unit 210 and is further configured to obtain contact information of the applicant terminal from the enterprise contact database according to the identity information of an applicant; and the voice approval request information sending unit 220 is further configured to send the contact information of the applicant terminal to the enterprise gateway.

Specifically, with reference to the second method embodiment and third method embodiment of the present invention, the enterprise application server is formed by an enterprise information portal and an ICT communication unit.

Functions of the voice approval request start information receiving unit 210 may be performed by the ICT communication unit, that is, the ICT communication unit receives voice approval request start information initiated by the applicant; functions of the contact information querying unit 240 may be specifically performed by the ICT communication unit, that is, the ICT communication unit obtains the contact information of the terminal from the enterprise contact database according to the identity information; functions of the voice approval request information sending unit 220 may be specifically performed by the ICT communication unit, that is, the ICT communication unit sends a voice approval request to the enterprise gateway; functions of the approval result information obtaining unit 230 may be specifically performed by the ICT communication unit, that is, the ICT communication unit obtains approval result information from the enterprise gateway.

In the embodiment of the present invention, a voice approval request can be sent to the enterprise gateway by combining the enterprise application server and the enterprise gateway.

Figure 13:
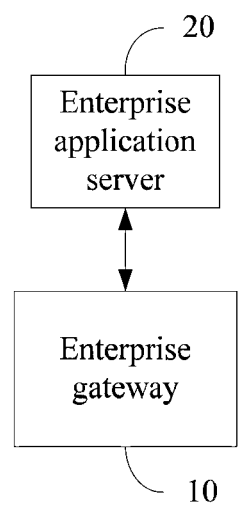
FIG. 13 is a structural diagram of a system embodiment of the present invention.

A first system embodiment of the present invention provides a system for processing enterprise workflow approval. As shown in FIG. 13, the system includes an enterprise gateway 10 and an enterprise application server 20.

The enterprise application server 20 is configured to receive voice approval request information; send the voice approval request information to the enterprise gateway, where the voice approval request information includes identity information of a pending work item and contact information of an approver terminal; and obtain approval result information sent by the enterprise gateway.

The enterprise gateway 10 is connected to the enterprise application server 20 and is configured to: receive the voice approval request information sent by the enterprise application server; establish a voice communication connection with the approver terminal according to the contact information of the approver terminal, send approval content audio information corresponding to the voice approval request information to the approver terminal by using the voice communication connection, receive feedback information which is sent by the approver terminal according to the approval content audio information, obtain approval result information according to the feedback information, and send the approval result information to the enterprise application server.

In the embodiment of the present invention, an enterprise gateway receives voice approval request information sent by an enterprise application server, establishes a voice communication connection with an approver terminal by using contact information of the approver terminal in the voice approval request information, and sends approval content audio information to the approver terminal by using the voice communication connection, so that the approver terminal learns pending content; the enterprise gateway receives feedback information, obtained by the approver terminal, of an approver with respect to the approval content audio information, obtains approval result information according to the feedback information, and feeds back the approval result information to the enterprise application server. By using the foregoing method, the enterprise application server can send an approval request to the approver terminal in audio mode, which makes it possible to perform approval in voice mode, thereby increasing the approval efficiency.

It may be clearly understood by persons skilled in the art that, for the purpose of convenient and brief description, for detailed working processes of the foregoing system, apparatus and unit, reference may be made to the corresponding processes in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated units may be implemented in the form of hardware, or may be implemented in the form of a software functional unit.

When the integrated units are implemented in the form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The storage medium includes: any medium that can store program code, such as a USB flash disk, a removable hard disk, a read-only memory (ROM), a random access memory (RAM, Random Access Memory), a magnetic disk, or an optical disk.

The foregoing description is merely about specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for voice approval, comprising:
    receiving, by an enterprise gateway, voice approval request information sent by an enterprise application server, wherein the voice approval request information comprises contact information of an approver terminal;
    establishing, by the enterprise gateway, a first voice communication connection with the approver terminal according to the contact information of the approver terminal;
    initiating, by the enterprise gateway, a request to a recording resource, to start recording voice information exchanged with the approver terminal during a session;
    receiving, by the enterprise gateway, a message indicating the request was successful and begins recording;
    recording, by the enterprise gateway, voice information exchanged with the approver terminal, wherein the voice information comprises approval content audio information, audio prompt information, and an approval result;
    sending, by the enterprise gateway, approval content audio information corresponding to the voice approval request information to the approver terminal by using the first voice communication connection;

receiving, by the enterprise gateway, feedback information which is sent by the approver terminal according to the approval content audio information, and obtaining the approval result information according to the feedback information;

terminating, by the enterprise gateway, the recording once approval result information has been received and storing the recorded voice information; and sending, by the enterprise gateway, the approval result information to the enterprise application server, wherein the approval result information comprises the approval result information, identity information of a pending work item, and a storage address for the recorded voice information.

2. The method according to claim 1, wherein: the voice approval request information further comprises contact information of an applicant terminal, and the method further comprises:

establishing, by the enterprise gateway, a second voice communication connection with the applicant terminal according to the contact information of the applicant terminal; and establishing, by the enterprise gateway, a third voice communication connection between the applicant terminal and the approver terminal;

the sending, by the enterprise gateway, the approval content audio information corresponding to the voice approval request information to the approver terminal by using the first voice communication connection comprises:

sending, by the enterprise gateway, the approval content audio information, sent by the applicant terminal, to the approver terminal by using the voice communication connection between the applicant terminal and the approver terminal.

3. The method according to claim 1, wherein: the voice approval request information further comprises approval content text information; and the sending, by the enterprise gateway, the approval content audio information corresponding to the voice approval request information to the approver terminal by using the first voice communication connection comprises:

converting, by the enterprise gateway, the approval content text information into the approval content audio information by using a text-to-speech technology, and sending the approval content audio information to the approver terminal by using the first voice communication connection.

4. The method according to claim 1, wherein: the voice approval request information further comprises identity information of the pending work item;

after the sending, by the enterprise gateway, the approval content audio information corresponding to the voice approval request information to the approver terminal by using the first voice communication connection, the method further comprises:

sending, by the enterprise gateway, approval prompt information to the approver terminal according to the identity information of the pending work item by using the first voice communication connection between the enterprise gateway and the approver terminal, wherein the approval prompt information comprises pre-stored mapping between approval results and keys of the approver terminal; and the receiving, by the enterprise gateway, the feedback information which is sent by the approver terminal according to the approval content audio information, and the obtaining the approval result information according to the feedback information comprise:

receiving, by the enterprise gateway, selected key information which is sent by the approver terminal according to the approval content audio information and the approval prompt information, and obtaining the approval result information according to the mapping between approval results and keys of the approver terminal.

5. An enterprise gateway device, comprising:

a voice approval request information receiving unit, configured to receive voice approval request information sent by an enterprise application server, wherein the voice approval request information comprises contact information of an approver terminal;

a connection establishing unit, connected to the voice approval request information receiving unit and configured to establish a first voice communication connection with the approver terminal according to the contact information of the approver terminal;

a service serving unit, configured to initiate a request to a recording unit once the first voice communication connection has been established and to start recording voice information exchanged with the approver terminal during a session, wherein the voice information comprises approval content audio information, audio prompt information, and an approval result;

an IP PBX unit configured to receive a message indicating the request was successful and begins recording the voice information, and wherein the IP PBX unit terminates the recording once approval result information has been received;

an approval content audio information sending unit, connected to the connection establishing unit and configured to send approval content audio information corresponding to the voice approval request information to the approver terminal by using the first voice communication connection;

an approval result information obtaining unit, configured to receive feedback information which is sent by the approver terminal according to the approval content audio information and obtain approval result information according to the feedback information;

a storing unit, configured to store the recorded voice information exchanged with the approver terminal once the approval result information has been received;

an approval result information sending unit, connected to the approval result information obtaining unit and configured to send the approval result information to the enterprise application server, wherein the approval result information comprises the approval result information, identity information of a pending work item, and a storage address for the recorded voice information.

6. The device according to claim 5, wherein: the voice approval request information further comprises contact information of an applicant terminal;

the connection establishing unit is configured to establish a second voice communication connection with the applicant terminal according to the contact information of the applicant terminal, and establish a third voice communication connection between the applicant terminal and the approver terminal; and the approval content audio information sending unit is configured to send the approval content audio information, which is received from the applicant terminal, to the approver terminal by using the third voice communication connection between the applicant terminal and the approver terminal.

7. The device according to claim 5, wherein the voice approval request information further comprises approval content text information, and the device further comprises:
a text-to-speech unit, configured to convert the approval content text information into the approval content audio information by using a text-to-speech technology, and send the approval content audio information to the approval content audio information sending unit.

8. The device according to claim 5, wherein: the voice approval request information further comprises identity information of the pending work item; and
the device further comprises an approval prompting unit, wherein:
the approval prompting unit is configured to send approval prompt information to the approver terminal according to the identity information of the pending work item by using the first voice communication connection between the enterprise gateway and the approver terminal, wherein the approval prompt information comprises pre-stored mapping between approval results and keys of the approver terminal; and
the approval result information obtaining unit is configured to receive selected key information which is sent by the approver terminal according to the approval prompt information, and convert, according to the mapping between approval results and keys of the approver terminal, the selected key information received by the receiving unit into the approval result information.

* * * * *